United States Patent
Flasher

Patent Number: 5,866,216
Date of Patent: Feb. 2, 1999

[54] SOUND ABSORBENT FABRIC SLEEVES

[75] Inventor: Gary L. Flasher, Spring City, Pa.

[73] Assignee: Davlyn Manufacturing Co., Inc., Spring City, Pa.

[21] Appl. No.: 895,930

[22] Filed: Jul. 17, 1997

[51] Int. Cl.$^6$ .................................................. B29D 23/00
[52] U.S. Cl. ...................... 428/36.1; 428/36.3; 428/373; 81/9; 442/189; 442/190; 442/191; 442/200
[58] Field of Search .................................. 428/36.3, 360, 428/361, 373, 375, 376, 377, 378, 391, 394, 398, 401, 36.1, 36.9; 57/224, 9; 442/189, 190, 191, 200; 66/170

[56] References Cited

U.S. PATENT DOCUMENTS

| | | | |
|---|---|---|---|
| 3,828,544 | 8/1974 | Alker | 57/152 |
| 4,754,685 | 7/1988 | Kite et al. | 87/9 |
| 4,836,080 | 6/1989 | Kite, III et al. | 87/9 |
| 4,870,887 | 10/1989 | Tresslar et al. | 87/9 |
| 4,989,422 | 2/1991 | Barlow et al. | 66/170 |
| 5,082,297 | 1/1992 | Flasher | 277/230 |
| 5,107,623 | 4/1992 | Weil | 49/485 |
| 5,186,992 | 2/1993 | Kite, III | 428/363 |
| 5,197,370 | 3/1993 | Gladfelter | 87/7 |

OTHER PUBLICATIONS

"The Dref 2 Friction Spinning Machine", Fehrer AG, Linz, Austria, 28 pages, Aug. 1995.

"The Dref 3 Friction Spinning Machine", Fehrer AG, Linz, Austria, 20 pages, Sep. 1995.

*Primary Examiner*—Ellis P. Robinson
*Assistant Examiner*—Jennifer M. Hayes
*Attorney, Agent, or Firm*—Panitch Schwarze Jacobs & Nadel, P.C.

[57] ABSTRACT

Sound absorbent fabric sleeves are formed from interthreaded, preferably braided, resilient, staple spun polymer yarns. Bulk and softness needed for sound absorption is provided through the staple fibers and resiliency desired for expansion capability and shape maintenance is provided through a resilient monofilament core. The yarns are sometimes referred to as dref mono/poly yarns. The sleeves can be heat set to better resist unraveling and maintain tubular shape. The yarns inherently resist fraying. A pressure sensitive or other adhesive layer or an elastomeric material or other material layer can be provided around all or part of the outsides of the sleeves. Spring clips can be provided extending through the tubes between the yarns to assist in mounting the sleeves or to modify them for uses other than sound absorption.

14 Claims, 1 Drawing Sheet

SOUND ABSORBENT FABRIC SLEEVES

BACKGROUND OF THE INVENTION

In recent years, a market has developed for sleeving which is used for sound absorption, particularly in sound proofing vehicles. Sleeving is provided over linkages, wires, tubes and similar movable parts, particularly where those parts are located behind panels of the vehicle, to muffle the sound made by such parts should they move in operation or be shaken while the vehicle moves. Textile fabric sleeves employing long lasting, textured, polymer plastic filament yarns are particularly desirable for use in premium automobiles, which provide one of the major markets for these products, because of their softness and bulkiness for sound reduction and their durability for long life.

Original sleeves were made from only interthreaded multifilament textured yarns. These sleeves were difficult to install. If knitted, they could be stretched to assist in installation but would not regain their original diameters and so could sag and/or move about. Braided sleeves can be somewhat contracted in diameter by stretching. However, unless tension can be maintained, they would expand in size and also sag and/or move about.

At least one known type of sound absorbent fabric sleeve is formed from textured, plastic multifilament bulky yarns and separate plastic monofilaments braided together. These sleeves are improvements over earlier sleeves formed of only the bulky, textured yarns. The bulky yarn/monofilament sleeves can be expanded to twice their nominal diameters or more by compressing the sleeves in their length directions to facilitate their installation and to permit their use on elements larger in size than the nominal diameters of such sleeves. Such sleeves are also capable of resiliently returning towards their nominal diameters in order to compress around the objects on which they are mounted so as to remain in their mounted positions.

While the bulky yarn/monofilament sleeves have distinct advantages over the earlier, all bulky yarn sleeves, they have at least one disadvantage. A hard spot is created where each monofilament crosses another monofilament in the braid. Each crossover creates a potential sound generating or at least non-absorbing spot along the sleeve. It would be desirable to provide a sound absorbent sleeve having the resilience of the above monofilament/multifilament sleeve but without the potential sound generating hard spots.

BRIEF SUMMARY OF THE INVENTION

The invention is a fabric sleeve comprising a plurality of substantially identical, individual, resilient, staple spun polymer yarns interthreaded together into a seamless fabric tube, each of the resilient, staple spun polymer yarns comprising a polymer monofilament core having a diameter of at least six mils wrapped with staple polymer filaments, individual staple polymer filaments being more than an order of magnitude smaller in diameter than the monofilament core, and each of the resilient, staple spun polymer yarns being between a 5 and 0.5 cotton count.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
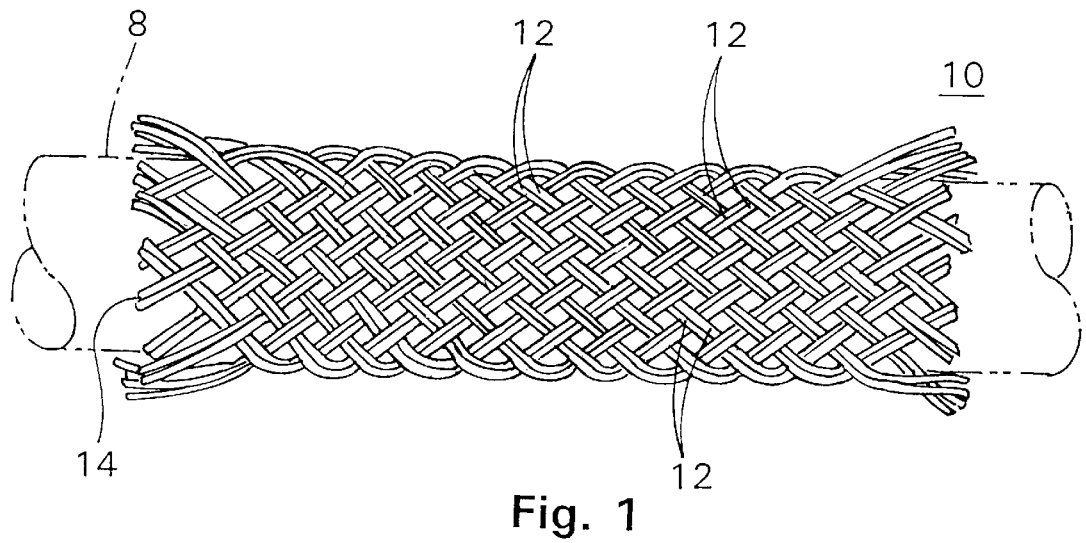
FIG. 1 is a perspective view of a sound absorbent fabric sleeve of the present invention.

In the drawings, like numerals are used to indicate like elements throughout. Also, where numerical values are indicated, they include values rounded to the least significant indicated digit.

FIG. 1 depicts part of the length of a fabric sleeve of the present invention, indicated generally at 10, used for sound absorption, particularly in vehicles of various types. The fabric sleeve 10 comprises and preferably consists essentially of a plurality of substantially identical, individual, resilient, staple spun polymer yarns 12 interthreaded together into a seamless fabric tube 14.

The yarns 12 are similar in appearance to continuous flexible cotton swabs of a uniform diameter. Preferred yarns 12 are formed on special machinery. Dref 2 or Dref 3 spinning machines of the Fehrer AG Company of Linz Austria. Such equipment is available in the United States from Symtech, Incorporated of Spartanburg, S.C. These machines friction spin staple fibers onto a core fed through the machine. The Dref 3 machine can simultaneously spin a staple core of a material different from the staple material spun onto the core as an outer sheath. Ready made preferred yarns can be obtained from Georgia Duck & Cordage Mill of Scottdale, Ga., which refers to the yarns as "DREF mono/poly" yarns. The yarns 12 can be interthreaded together into a seamless fabric tube like tube 14, by knitting, braiding or weaving although braiding is preferred. The sleeve is mounted on a vehicle part 8 (in phantom) to at least deaden any sound that might otherwise be made by movement of the part.

Figure 2:
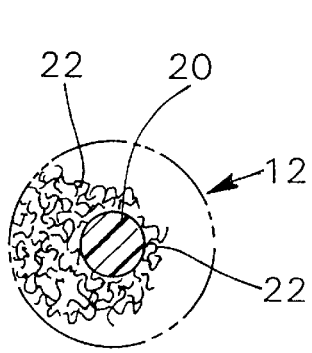
FIG. 2 is a is a diagrammatic cross sectional view of a resilient, staple spun polymer yarn utilized in the present invention.

FIG. 2 depicts one of the staple spun yarns 12 in cross section. The particular staple spun polymer yarn shown in FIG. 2 comprises a single, resilient polymer monofilament core 20 several mils in diameter, which is wrapped (actually "spun") with smaller, staple polymer filaments 22. Each of the staple polymer filaments 22 is more than an order of magnitude smaller in diameter than the monofilament core 20.

As an example, a conventional forty-four carrier circular braider is loaded with only the staple spun polymer yarns 12. Each of the yarns 12 is a 2/0 (2.0) cotton count and has a single polyester monofilament core about 12 mils in diameter spun with staple polyester filaments much less than 1 mil in diameter. The spun staple filaments are about 1.75 denier per filament and a half-mil or less in diameter. The staple filaments appear to be only a few microns or less in diameter. The circular braider was configured for an over two/under two (two over/two under) basket as opposed to twill braid and yielded a seamless fabric tube about ⅝ inch (about 18–20 mm) in nominal diameter with approximately seven crossover per inch in the warp (length) direction and about fourteen crossovers per inch in the fill(diametric or width) direction. "Nominal diameter" is the outer diameter (circumference/pi) of the uncompressed and untensioned sleeve. Each crossover is defined by two yarns crossing two other yarns.

The same type of staple spun polymer yarns 12 arranged on the same forty-four carrier circular braider with the same two over/two under basket braid yielded a seamless fabric tube approximately ½ inch (about 12–14 mm) in nominal diameter with about ten crossovers per inch in the warp direction and sixteen crossovers per inch in the fill direction.

The same staple spun yarns arranged on a thirty-two carrier circular braider also configured for the same two over/two under basket braid yielded a seamless fabric tube about ⅜ inch (about 10 mm) in nominal diameter with about eight crossovers per inch in the warp direction and eighteen crossovers per inch in the fill direction.

Lastly, the same staple spun polymer yarns 12 on each of the carriers of a twenty-four carrier circular braider configured for the same two over/two under basket braid yielded a seamless fabric tube approximately ¼ inch (6–7 mm) in nominal diameter with about nine crossovers per in the warp direction and about thirty-two crossovers per inch in the fill direction.

The aforesaid example sleeves can be heat set by heating to a material temperature of about 350° F. This can be accomplished, for example, by exposing each tube to a temperature of about 400° F. for about four (4) seconds as they exit the braider or at any time thereafter in a separate subsequent processing step or to another temperature for an appropriate period of time.

While polyolefin monofilament and staple filaments have been found particularly suited for fabricating such sleeves, it is believed that other polymer materials (including copolymers and filled or composite polymers) can be suitable for fabrication into such yarns for sound absorption. In addition the DREF machinery is capable of spinning materials such a P-aramid cores and cotton or viscose FR sheaths for yarns of relatively high abrasion resistance and flame retardance for use in hotter areas such as in or around a vehicle engine compartment. The minimum tensile strength of the monofilament for adequate resiliency is suggestibly at least 70,000 psi and it is believed that monofilaments up to 200,000 psi in tensile strength can be successfully braided in the previously described manner into seamless fabric sleeves on conventional, circular braider equipment.

The resilient, staple spun polymer yarns of the type described above provide a level of softness and bulk with resiliency found to be ideal for making seamless fabric tubes for sound absorbing use. These yarns braid extremely well in conventional circular braiding machines without fraying of their ends. The yarns can be heat set on the braiders or after braiding to retard separation of the sleeve ends and to otherwise hold circular shape and nominal diameter. The yarns tend to interlock with one another at the crossovers enabling these sleeves to be easily "backed up" (compressed in their longitudinal direction) to uniformly expand their diameters at least two and in some instances up to about three times their nominal diameters for ease of mounting and for fitting the sleeves on elements larger in size than the nominal diameters of the sleeves. Their resiliency causes them to return towards their original nominal diameters and to remain where mounted on objects about equal to or larger in size than their nominal diameters.

Based upon the characteristics of the resilient, staple spun yarns worked with thus far, it is believed that yarns used particularly for sound absorbent sleeves may range from a 0.5 to a 5.0 (0/5–5/0) cotton count in size, that the single monofilament core 20 of each yarn 12 can range from at least 6 mil up to at least 18 mil in diameter (at least for polyester) and that the thickness of the spun staple filament layer around the monofilament core can also be varied from about thirty percent up to at least about seventy percent of the nominal diameter of such yarns.

The presently preferred resilient, staple spun yarn have but a single, continuous monofilament core. However, it is possible to provide two monofilament cores or a monofilament core and a continuous multifilament yarn core, which extend continuously along the length of the staple spun yarn, generally parallel to one another, and which are circumferentially wrapped by the staple filaments.

Figure 3:
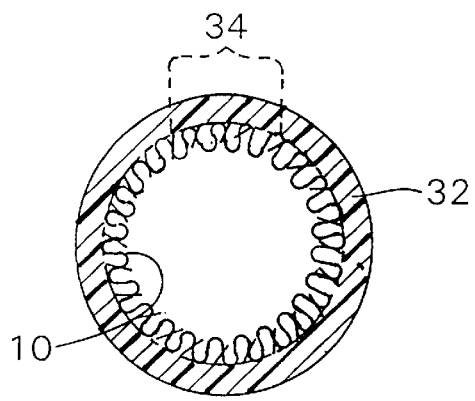
FIG. 3 is a diagrammatic cross section of a sleeve of FIG. 1 with an outer covering.

It is further believed that due to the characteristics that make them desirable for sound absorption, sleeves of the present invention may have numerous other uses. For example, referring to FIG. 3, the tubular sleeve 10 of the present invention made of polyester and/or other man-made polymers can be coated along part or all of the outer surface of the sleeve with an elastomer coating 32 like silicone rubber or an acrylic coating or provided with a strip layer of contact adhesive 34 (in phantom) along one side of their outer surface, or coated with both as is disclosed in U.S. Pat. No. 5,082,297, which is incorporated by reference in its entirety herein.

Figure 4:
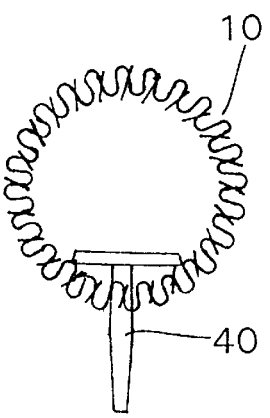
FIG. 4 is a diagrammatic of a sleeve of FIG. 1 with one of a plurality of individual bent wire spring clips.

Also, referring to FIG. 4, individual bent wire spring clips 40 for mounting such sleeves as gaskets can be installed in such sleeves in any of the ways disclosed in U.S. Pat. Nos. 4,986,033, and 5,107,623 as well as in U.S. patent application Ser. Nos. 08/514,057 and 08/581,011, all incorporated by reference herein in their entirety. Alternatively bent wire forms bearing numerous individual but connected clips like those disclosed in U.S. Pat. No. 4,822,060, incorporated by reference herein, can be used.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A sound absorbent fabric sleeve comprising a plurality of individual, resilient, staple spun polymer yarns interthreaded together into a seamless fabric tube, each of said resilient, staple spun polymer-yarns comprising a polymer monofilament core having a diameter of at least six mils wrapped with staple polymer filaments, each of said staple polymer filaments being more than an order of magnitude smaller in diameter than said polymer monofilament core, and each of said resilient, staple spun polymer yarns being between a 5 and a 0.5 cotton count.

2. The sleeve of claim 1 wherein each of the plurality of resilient, staple spun polymer yarns consists essentially of a single, continuous, centrally located polymer monofilament forming the polymer monofilament core and the staple polymer filaments are wrapped around the single monofilament.

3. The sleeve of claim 1 wherein the seamless fabric tube consists essentially of the plurality of interthreaded, resilient, staple spun polymer yarns.

4. The sleeve of claim 1 wherein the plurality of resilient, staple spun polymer yarns are braided together to define the seamless fabric tube.

5. The sleeve of claim 1 wherein each of the plurality of resilient, staple spun polymer yarns consists essentially of polyolefins.

6. The sleeve of claim 1 wherein the seamless fabric tube has been heated sufficiently to set the resilient, staple spun polymer yarns of the seamless fabric tube into a tubular configuration.

7. The sleeve of claim 1 further comprising an acrylic coating applied to an outer tubular surface of the seamless fabric tube.

8. The sleeve of claim 1 further comprising a silicone rubber coating applied to an outer tubular surface of the seamless fabric tube.

9. The sleeve of claim 1 further comprising a strip layer of adhesive extending along an outer tubular surface of the seamless fabric tube.

10. The sleeve of claim 1 further comprising a plurality of bent wire spring clip members, each spring clip member including a base portion located within the seamless fabric tube and an engagement portion projecting at least generally perpendicular from the base portion and passing through adjoining resilient, staple spun yarns of the plurality defining the fabric tube.

11. The sleeve of claim 1 wherein each polymer monofilament core is centered in its resilient, staple spun polymer yarn and has an outer diameter between six and eighteen mils.

12. The sleeve of claim 1 wherein the staple polymer filaments of each yarn are false twisted around the polymer monofilament core.

13. The sleeve of claim 1 having a nominal outer diameter of 1 inch or less.

14. The sleeve of claim 1 wherein:

the seamless fabric tube consists essentially of the plurality of resilient, staple spun polymer yarns braided together; and each of the plurality of resilient, staple spun polymer yarns consists essentially of the staple polyolefin filaments and a single, continuous, centrally located, resilient polyolefin monofilament forming the polymer monofilament core, the staple polyolefin filaments being false twisted around the single, continuous polyolefin monofilament.

* * * * *